United States Patent
Costa et al.

[19]

[11] Patent Number: 6,157,593
[45] Date of Patent: Dec. 5, 2000

[54] POWER ENVELOPE SHAPER

[75] Inventors: David R. Costa, Taunton, Mass.; Seth B. Suppappola, North Kingstown, R.I.

[73] Assignee: The United States of America as represented by the Secretary of the Navy, Washington, D.C.

[21] Appl. No.: 09/252,243

[22] Filed: Jan. 14, 1999

[51] Int. Cl.$^7$ .................................................. H04B 1/02
[52] U.S. Cl. ............................................................ 367/137
[58] Field of Search ........................ 367/100, 107, 367/138, 903, 137; 327/100, 107

[56] References Cited

U.S. PATENT DOCUMENTS 4,654,833   3/1987   Drefahl .................................. 367/138
5,563,845  10/1996   Walsh ...................................... 367/7

*Primary Examiner*—Daniel T. Pihulic
*Attorney, Agent, or Firm*—Michael J. McGowan; James M. Kasischke; Prithvi C. Lall

[57] ABSTRACT

A power envelope shaping device for joining to a serial control output is disclosed. Multiple power switcher modules are joined to a plurality of incremental power sources and controlled by the power select circuitry module. In this way, each power switcher module can provide power from at least one of the incremental power sources on command from said power select circuitry module. The power switcher module outputs are joined together in order for providing varying power levels in accordance with a preprogrammed power envelope shape.

15 Claims, 4 Drawing Sheets

POWER ENVELOPE SHAPER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The invention described herein relates to electronic circuits and their use in shaping power envelopes, and sonar systems making use of a shaped power envelope.

(2) Description of the Prior Art

It is known in the art to use pulsed (or gated) waveform in active sonar systems. These pulsed sonar systems may use signals that are continuous wave (CW), linear frequency modulated (LFM), stepped FM, etc. Often, two power levels are used: high power for long-range targets and low power for short-range targets. These predetermined power levels are used as the supply for the transmitter amplifier, which amplifies the gated signal and applies it to the transducer. Gating the transmit signal is equivalent to transmitting a signal with a square pulse envelope.

There are certain advantages, however, to transmitting a signal with a nonsquare-shaped envelope. For example, in the case of a gated sinusoid, the bandwidth of the transmitted signal is actually the bandwidth of the square pulse (a sinc function, in the frequency domain) centered about the frequency of the sinusoid. This gating results in sidelobes in the spectrum that are 13 dB down from the mainlobe. To reduce the sidelobes, it is necessary to shape the envelope of the transmitted sinusoid. In fact, sidelobes can be practically eliminated if a Gaussian-shaped envelope is used, but only at the expense of a wider mainlobe. Nevertheless, this condition may be desirable in certain applications.

When using a nontrivial shape for the envelope of a transmitted signal, signal generation becomes a more complex process than simple gating. One approach uses a low-level digital or analog electronics to generate the desired signal and its envelope, which is then applied to a linear power amplifier for application to the transducer. However, linear amplifiers are large, expensive, and inefficient. This inefficiency results in the internal dissipation of a considerable amount of power, which leads to massive heat transfer issues.

A need exists for a device which can efficiently provide control of a power envelope. Rapid switching, as well as low power loss, is required in order to generate a shaped power envelope efficiently.

SUMMARY OF THE INVENTION

It is an object of the invention to provide a power supply system having a shaped power curve.

It is a further object of the invention to provide a low power loss shaper for generating a signal.

It is a further object of the invention to provide a power envelope-shaping module, which may be adapted to existing sonar systems.

It is another object of the invention to provide a sonar system having a power envelope shaper using output transistors in two discrete states, either saturated or cut off.

Accordingly, the invention is a power envelope shaping device for joining to a serial control output. The device includes a power select circuitry module joined to the serial output. Multiple power switcher modules are joined to a plurality of incremental power sources and controlled by the power select circuitry module. In this way, each power switcher module can provide power from at least one of the incremental power sources on command from said power select circuitry module. The power switcher module outputs are joined together in order for providing varying power levels in accordance with a preprogrammed power envelope shape.

In a further embodiment, there is provided a sonar system comprising a computer for system control, a power envelope shaper, a transmitter module, and a transducer array. The power envelope shaper is comprised of three components, the power select circuitry module, the power switcher module, and the battery pack. The power envelope shaper receives control signals from the system computer. These control signals, serial data and data clock, are processed by a power level decoder, which enables a selected output channel at the appropriate time. Each power switcher channel controls a single tap of the battery pack by enabling and disabling its output. If two or more taps are enabled at the same time, the highest voltage will prevail. The output power from the power switcher is fed directly to a sonar transmitter and controls the amplitude of the acoustic sonar signal. The topside computer provides the serial data control signals to the power switcher, using fast switching speeds throughout a plurality of channels, thereby allowing for the production of different sonar envelope shapes. The device as configured produces a Gaussian-shape with reduced side lobes.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
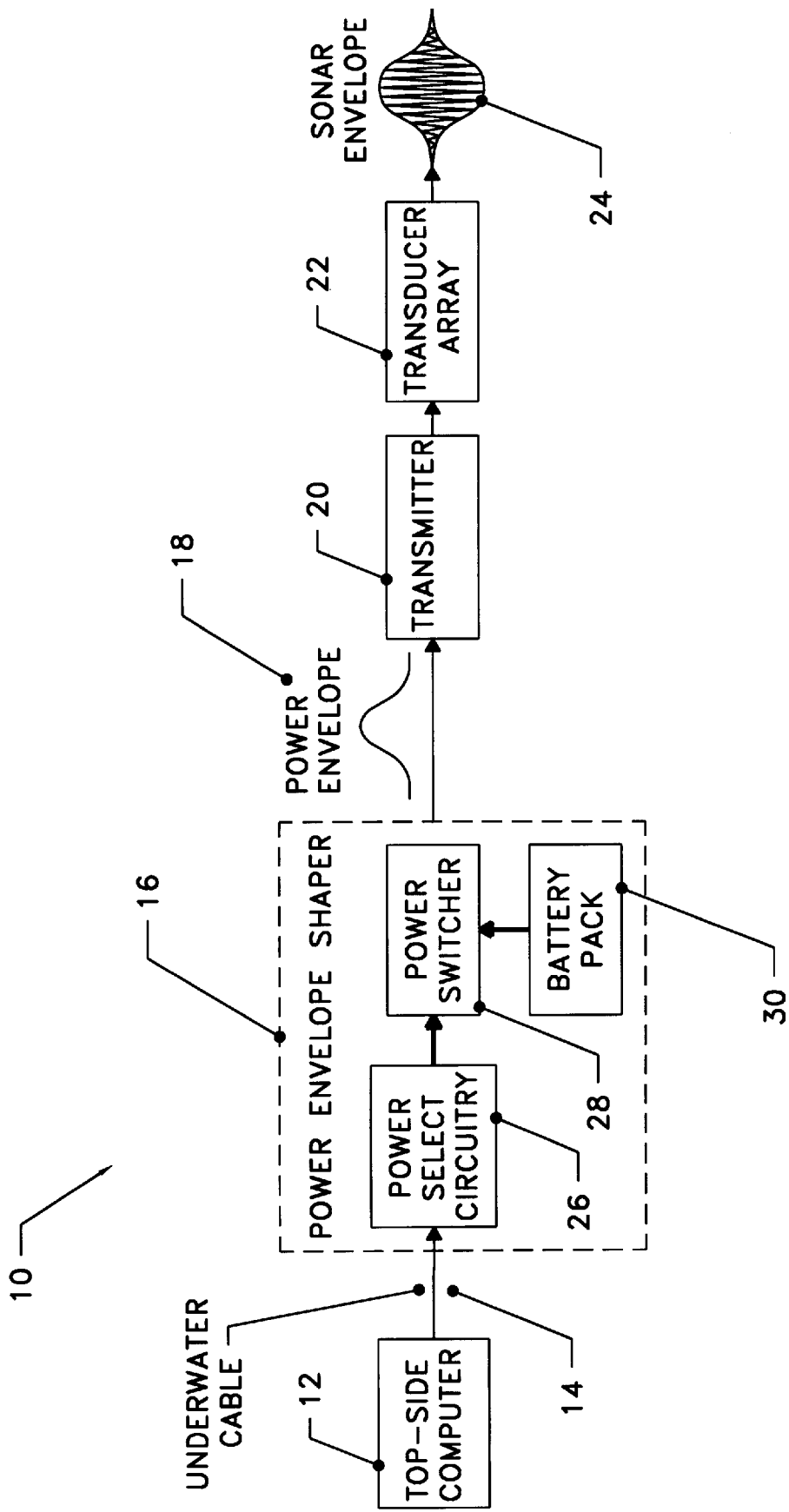
FIG. 1 is a block diagram of the sonar system with a power envelope shaper.

Referring now to FIG. 1, the sonar system, designated generally by the reference numeral 10, is depicted in a block diagram showing its major components. A topside computer 12 controls the system by underwater cable 14 that is connected to the power envelope shaper module 16, the shaped power envelope 18 is outputted to the sonar transmitter 20 which, in turn, powers the transducer array 22. The result is a shaped sonar signal 24 having particular characteristics, such as reduced sidelobes, depending on the transmitted shape. The transmitted shape is determined by the power select circuitry 26 and the power switcher 28 located within the power envelope shaper 18. A multi-tap battery pack 30 provides power to the power switcher 28 to form the power envelope shape. The power envelope shaper 16 may be used with an existing sonar transmitter and transducer array to form a sonar signal envelope shaper. The power envelope shaper 16 is a self-contained, high speed, high power, efficient, power amplitude shaping device. The topside computer 12 digitally controls the power envelope shaper which outputs a preprogrammed arbitrary power envelope. This computer is preferably built on a VersaModule Eurocard (VME) chassis having a serial output port; however, other commonly available computers can be used.

The power envelope shaper can be used by existing sonar transmitters and arrays to produce a shaped sonar waveform. The transmitter and transducer package in the preferred embodiment has a common ground wired to the case in several locations, thereby requiring the use of a high-side driver for the power switcher. A high-side driver is one in which the supply power is switched before reaching the load, whereas, a low-side driver is one in which the supply power is switched between the load and the supply ground.

Figure 2:
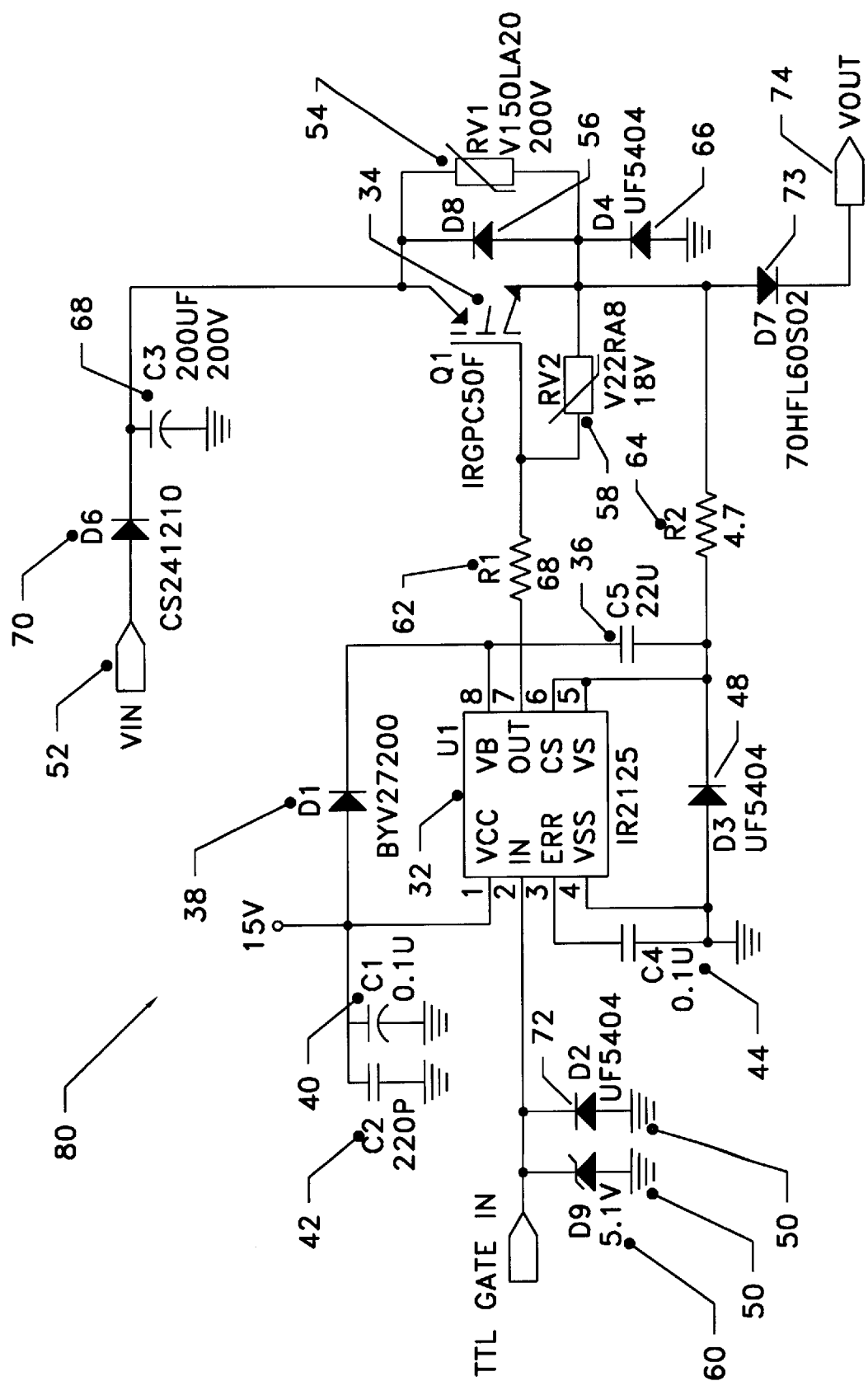
FIG. 2 is a block diagram depicting a single output channel of the power switcher.

A more detailed view of the power envelope shaper 16 may be seen in FIG. 2, which shows a single channel 80 of the multiple channel power envelope shaper 16. A TTL and Complimentary Metal Oxide Semiconductor (CMOS)-compatible MOS gate driver 32 used to switch the power-gating device 34. As discussed previously, MOS gate driver 32 must be a high side driver. Accordingly, gate driver 32 provides a differential output voltage. Gate driver 32 must also provide high input and output currents in order to turn power-gating device 34 on and off because of the high capacitance of the power-gating device 34. MOS gate driver 32 is preferably an International Rectifier IR2125TM. Gate driver 32 uses a bootstrap or floating supply technique in which capacitor 36 is charged through diode 38 and keeps the power gating device 34 gate fifteen volts above the emitter voltage when the power gating device 34 is on. This floating supply technique is well known and widely used and is very effective in high-side switching designs. Diode 38 is a fast recovery diode, so that capacitor 36 does not discharge. Capacitors 40 and 42 are bypass capacitors required to supply the transient current needed for refreshing the bootstrap supply. Capacitor 44 is a despiking capacitor used to suppress switching transients when the error output of gate driver 32 is not used. Diode 72 and diode 48 are fast turn-on diodes that protect the gate driver 32 by suppressing negative voltage transients. These voltage transients are caused by flyback current that is produced when switching an inductive load. The voltage V across an inductor L follows the relation:

$$V = L\frac{di}{dt} \quad (1)$$

where di/dt is the time derivative of current flow through the inductor.

In this circuit, flyback current flows from ground 50 back to the high power supply, VIN 52, when the power gating device 34 turns off. This negative traveling current causes large negative voltage spikes. The metal oxide varistor (MOV) 54 and diode 56 protect the power gating device 34 collector-emitter junction from inductive flyback, in the same way that varistor 58 protects the gate-emitter junction. Zener diode 60 clamps positive transients above the Zener breakdown voltage of 5.1 V. Resistor 62 and resistor 64 limit the switching speed of the power gating device 34, resulting in slower turn-on and turn-off. This also results in a decrease in unwanted flyback, because di/dt in equation (1) is reduced. Resistance of resistors 62 and 64 can be decreased if faster switching is required, but only at the expense of larger flyback transients. The fast turn-on diode 66 helps clamp negative voltage transients at the power gating device's emitter. Capacitor 68 is the bypass capacitor for the high-power supply. Diode 70 isolates each battery output from the others, while a fast turn-on diode 73, isolates each switching block from the others. The diode 73 is necessary so that the outputs of each switching block can be hard-wired together. In this configuration, the highest enabled output 74 will prevail. Power-gating device 34 must have a rise time of at most 49 ns and a fall time of at most 410 ns. An insulated gate bipolar transistor (IGBT) with high-power capabilities and a typical turn-on time of 43 nanoseconds was selected to fulfill these requirements for the power-gating device 34. MOSFET circuitry was initially tried for the power gating device 34, but the circuitry was unable to handle the high current requirements. The insulated gate bipolar transistor is preferably an International Rectifier IRGPC50FTM. Each power switcher channel is capable of 70 Amperes of continuous current, a 600V breakdown voltage, and a maximum internal power dissipation of 200 Watts. High efficiency and a small package size are made possible because the IGBTs are operated in either the saturation or cutoff region. The operation allows for a minimal internal power dissipation and necessitates only small heat sinks. In the preferred embodiment, a TO-247 heat sink with one-inch fins was used to dissipate heat from the power-gating device 34.

Figure 3:
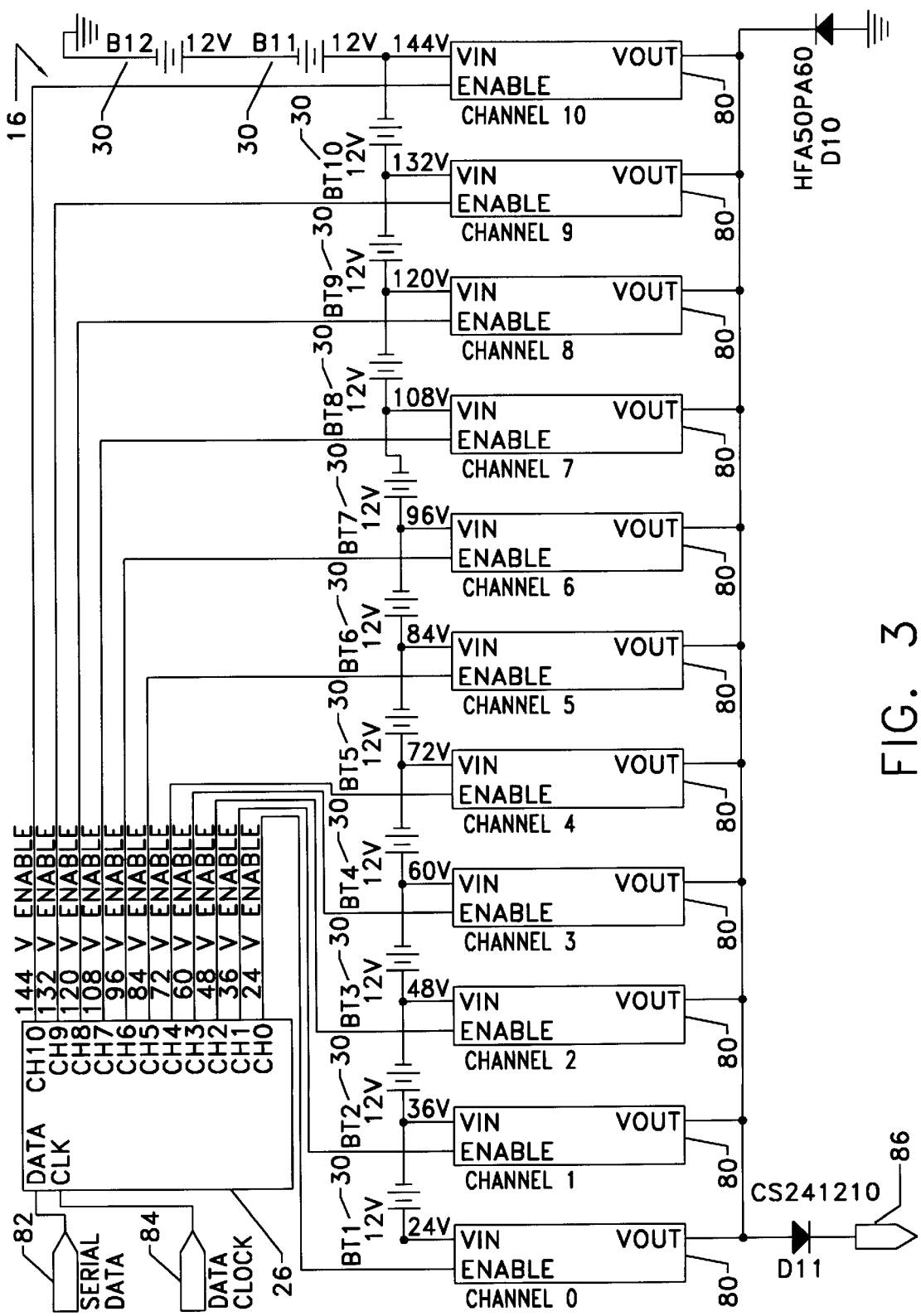
FIG. 3 is a block diagram of the complete power switcher circuit.

The complete power envelope shaper is shown in FIG. 3 including the field programmable gate array (FPGA)-based power level decoder (power select circuit 26), multi-tap battery pack 30, and each power-switcher channel 80. (For clarity only part of the channels and battery numerals are shown, each repeating in the array.) The control signals, serial data 82 and data clock 84 are processed by the power level decoder 26 which enables each power switcher channel 80 at the appropriate time. Each power switcher channel 80 controls a single tap of the battery pack 30 by enabling and disabling its output. A power envelope is produced by switching each battery tap at the appropriate time to generate the desired power waveform. The output power 86 from the power switcher 80 is fed directly to a sonar transmitter and controls the amplitude of the acoustic sonar signal. The desired sonar signal shape for this application was a Gaussian envelope, although the envelope shaper is versatile enough to produce an envelope of arbitrary shape.

Figure 4:
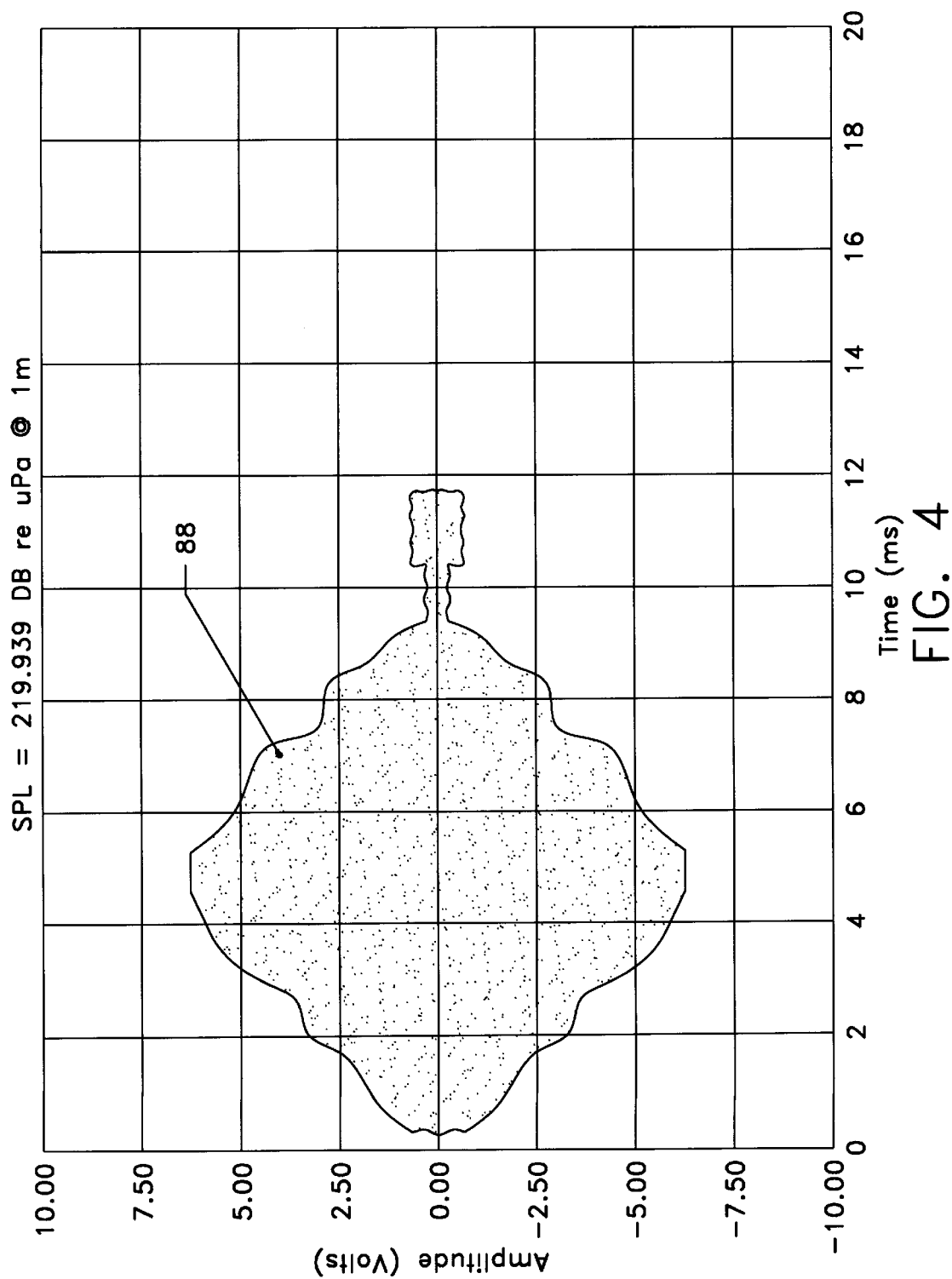
FIG. 4 is a graph depicting a Gaussian-shaped sonar pulse produced by the system.

FIG. 4 shows the Gaussian acoustic sonar signal that was produced. The shape and duration of the pulsed signal is digitally controlled by topside computer 12, which transmits a serial digital word via an underwater cable to a wet-side power level decoder 26. The serial word is decoded by an FPGA-based power level decoder, which generates the eleven enable signals that control each power switcher 80. To produce a Gaussian envelope, the eleven discrete power levels were enabled sequentially and then disabled in a descending order. The transmitter uses this power to produce a pulsed sonar signal resulting in the Gaussian envelope 88.

The features and advantages of the invention are numerous. The computer control allows for fast switching speeds and the generation of virtually any power envelope shape. The power envelope shaper described above was developed as a separate underwater module, which may be used with an existing sonar transmitter in order to shape the envelope of a pulsed sonar signal. The use of discrete states wherein transistors operate only in the saturated or cut-off modes provide high efficiencies and minimum internal heat generation.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A power envelope shaping device comprising:
   a power select circuitry module for joining to a control output;
   a plurality of incremental power sources; and
   at least one power switcher module joined to at least one of said plurality of incremental power sources and controlled by said power select circuitry module, each said power switcher module output providing power from said at least one of said plurality of incremental power sources on command from said power select circuitry module, said power switcher module outputs being joined together for providing varying power levels in accordance with said control output;
   wherein each said power switcher module comprises:
   a power gating device joined to said at least one of said plurality of incremental power sources; and
   a high-side driver connected to said power select circuitry module and said power gating device.

2. The device as in claim 1 wherein said high-side driver comprises a metal oxide semiconductor gate driver.

3. The device as in claim 1 wherein said power gating device comprises an insulated gate bipolar transistor.

4. The device as in claim 1 further comprising:
   a computer having a preprogrammed power envelope shape and a serial output for providing said control output; and
   said power select circuitry module comprises a decoder for translating said computer serial output to commands for each said at least one power switcher module.

5. The device as in claim 4 wherein said decoder is a field programmable gate array.

6. The device as in claim 4 wherein said power envelope shape is formed by sequentially activating said power gating devices.

7. The device as in claim 6 wherein said power envelope is given a Gaussian-shaped envelope.

8. A sonar system comprising:
   a computer;
   an underwater cable having a first end and a second end, such cable connected to said computer on a first end;
   a power envelope shaper module connected to the second end of said underwater cable;
   a sonar transmitter connected to said power envelope shaper module; and
   a transducer array connected to said transmitter.

9. A sonar system as in claim 8 wherein said power envelope shaper comprises:
   at least one power select circuitry module joined to said underwater cable second end;
   a plurality of battery cells;
   at least one power switcher module joined to at least one of said plurality of battery cells and controlled by said power select circuitry module, each said power switcher module output providing power from said at least one of said plurality of battery cells on command from said power select circuitry module, said power switcher module outputs being joined together for providing varying power levels to said sonar transmitter.

10. A sonar system as in claim 9 wherein each said power switcher module comprises a power gating device joined to said at least one battery and a high-side driver connected to said power gating device.

11. A sonar system as in claim 10 wherein said high-side driver comprises metal oxide semiconductor (MOS) gate driver.

12. A sonar system as in claim 10 wherein said power gating device comprises an insulated gate bipolar transistor.

13. A sonar system as in claim 9 wherein said power select circuitry module comprises a decoder, said computer having a preprogrammed power envelope shape and a serial output, said decoder translating said computer serial output to commands for each said at least one power switcher module in accordance with said preprogrammed power envelope shape.

14. A sonar system as in claim 13 wherein said power select circuitry module comprises a field programmable gate array decoder.

15. A sonar system as in claim 13 wherein said preprogrammed power envelope shape is a Gaussian-shape.

* * * * *